ns of this invention is to provide
United States Patent Office 3,567,457
Patented Mar. 2, 1971

3,567,457
SILVER HALIDE EMULSIONS SENSITIZED WITH PHOSPHOCYANINE DYES
John A. Ford, Jr., Rochester, N.Y., assignor to Eastman Kodak Company, Rochester, N.Y.
No Drawing. Filed Oct. 9, 1967, Ser. No. 673,923
Int. Cl. G03c 1/08
U.S. Cl. 96—142     10 Claims

ABSTRACT OF THE DISCLOSURE 1-indenylidenetriarylphosphorane is a class of stable phosphorus ylides which react with appropriate electrophilic reagents to form various dyes. Some of the dyes are useful spectral sensitizers in silver halide emulsions.

---

The present invention relates to dye intermediates, a method for preparing such dye intermediates, dyes from such intermediates, and photographic silver halide emulsion layers spectrally sensitized with such dyes.

A phosphorus ylide compound is a pentavalent phosphorus compound for which two limiting resonance forms can be drawn. One form contains a carbon to phosphorus double bond

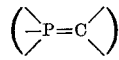

and the second contains a formal charged form at the same site

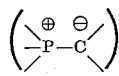

These phosphorus ylides as a rule decompose when exposed to air and moisture. However, certain phosphorus ylides have been found which do not decompose but remain stable in the presence of air and moisture. An example of such a stable phosphorus ylide is cyclopentadienylidenetriaryl phosphorane (U.S. Pats. 3,140,283 and and 3,143,544). Further, certain of these phosphorus ylides have been shown to couple with diazonium salts to form azo dyes and with various cyanine intermediates to form phosphocyanine dyes. Some of these phosphorus ylide dyes, in particular, those of the cyanine class, can be used to spectrally sensitize silver halide emulsions. However, these dyes are not highly efficient, since they do not absorb sufficient light in the non-blue regions of the visible spectrum, especially near the red region, i.e. 600–700 m$\mu$. Therefore, it would be highly desirable to provide a novel class of phosphorus ylide dye intermediates from which dyes could be formed, some of which not only spectrally sensitize silver halide emulsions to the green and red regions of the spectrum, but also sensitize these silver halide emulsions in a highly efficient manner.

It is, therefore, an object of this invention to provide novel phosphorus ylide dye intermediates.

Another object of this invention is to provide a new method of preparing such dye intermediates.

Still another object of this invention is to provide dyes from such intermediates.

A further object of this invention is to provide dyes which are useful as spectral sensitizers.

Still another object of this invention is to provide dyes which are substantially more efficient than those of the prior art.

Yet another object of this invention is to provide photographic silver halide emulsions spectrally sensitized with the novel dyes of the present invention.

Other objects of this invention will become apparent from the following description and claims.

I have found that 1-indenylidenetriarylphosphorane is a class of extremely useful phosphorus dye intermediates, including those represented by the following general formula:

(I)

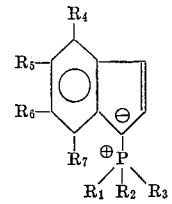

wherein $R_1$, $R_2$ and $R_3$ are aryl, and $R_4$, $R_5$ and $R_6$ and $R_7$ represent a monovalent radical. A wide variety of 1-indenylidenetriarylphosphoranes having Formula I can be employed. $R_1$, $R_2$, and $R_3$ can be a substituted or unsubstituted aryl radical, such as phenyl, tolyl, naphthyl, halophenyl (i.e. fluorophenyl, chlorophenyl, bromophenyl and iodophenyl), alkoxyphenyl (e.g., methoxyphenyl, ethoxyphenyl, etc.), arylphenyl (e.g., phenoxyphenyl), etc. Highly useful results are obtained when $R_1$, $R_2$ and $R_3$ are unsubstituted phenyl radicals. $R_4$, $R_5$, $R_6$ and $R_7$ can each be a monovalent radical such as H, alkyl (such as methyl, ethyl, propyl, isopropyl, butyl, isobutyl, pentyl, etc., especially a lower alkyl group), aryl (such as phenyl, tolyl, naphthyl, chlorophenyl, bromophenyl, methoxyphenyl, ethoxyphenyl, phenyloxyphenyl, etc., especially a phenyl group), halogen (e.g., bromo, chloro, iodo), hydroxy, alkoxy (such as methoxy, ethoxy, propoxy, etc., especially a lower alkoxy group), aryloxy (e.g., phenoxy, especially a lower aryloxy group), carboxy, cyano, nitro, amino, substituted amino (such as dimethylamino, methylethylamino, diethylamino, etc.), sulfo, sulfino, etc. Also, any two of the radicals $R_4$, $R_5$, $R_6$ and $R_7$ which are adjacent can be taken together to form a carbocyclic ring such as benzene, substituted benzene (e.g., toluene, chlorobenzene, bromobenzene, methoxybenzene, ethoxybenzene, phenyloxybenzene, etc.), naphthalene, substituted naphthalene, etc., or a heterocyclic ring such as pyrrole, furan, thiophene, imidazole, oxazole, thiazole, pyrazole, pyridine, pyrimidine, etc. Highly useful results are obtained when $R_4$, $R_5$, $R_6$ and $R_7$ each represent hydrogen. Some specific compounds included in the above formula, and which can be utilized to make dyes having Formulas II, III and IV below, include:

5-methyl-1-indenylidenetrinaphthylphosphorane;
6-phenyl-1-indenylidenetri(p-tolyl)phosphorane;
7-hydroxy-1-indenylidenetri(p-bromophenyl) phosphorane;
4-nitro-1-indenylidenetri(p-ethoxyphenyl)phosphorane;
5-nitro-1-indenylidenetri(p-phenoxyphenyl)phosphorane;
6-carboxy-1-indenylidenetriphenylphosphorane;
7-cyano-1-indenylidenetriphenylphosphorane;
5-sulfo-1-indenylidenetriphenylphosphorane;
6-sulfino-1-indenylidenetriphenylphosphorane.

I have further found that the 1-indenylidenetriarylphosphoranes of the present invention can be prepared by reacting a 1-haloindene successively with a triarylphosphine (preferably at elevated temperature) and an aqueous weak base. The halogen group of the 1-haloindene can be fluoro, chloro, bromo, or iodo, although 1-bromoindene is preferred. Also the aryl groups of the triarylphosphine can be a substituted or unsubstituted aryl radical, such as phenyl, tolyl, naphthyl, halophenyl (i.e., fluorophenyl, chlorophenyl, bromophenyl and iodophenyl), alkoxyphenyl (e.g., methoxyphenyl, ethoxyphenyl, etc.), aryloxyphenyl (e.g., phenoxyphenyl), etc. Highly useful results are obtained when $R_1$, $R_2$ and $R_3$ are unsubstituted phenyl radicals. The aqueous weak base can be a base having a pH between 10 and 12, such as ammonia, sodium carbonate, and the like. This preparation can be readily carried out by reacting about a mole of a 1-haloindene with an equimolar portion of a triarylphosphine in an excess of a suitable polar solvent. A wide variety of polar solvents can be utilized. Suitable solvents can readily be ascertained by one skilled in the art. Generally such solvents are polar solvents such as lower alkanols like ethanol and methanol, lower alkyl ketones such as methyl ethyl ketone and nitriles such as acetonitrile. Solvents such as acetonitrile are preferred. The resultant solution is then treated with an equimolar quantity of an aqueous weak base and stirred until precipitation is substantially complete.

I have also found that the 1-indenylidenetriarylphosphoranes of the present invention react readily with diazonium salts and cyanine intermediates to form dyes. The dyes formed comprise a first and second nucleus joined by either a methine or azo linkage; one of the nuclei being a 1-indenylidenetriarylphosphorane as described above, joined at the 3-carbon atom thereof to the linkage, the other being a cyclic nucleus. Preferred classes of dyes of the present invention are represented by one of the following three general formulae:

(II)

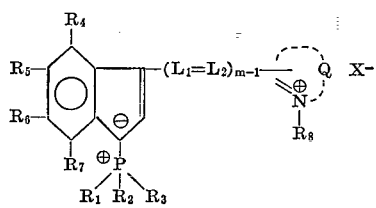

(III)

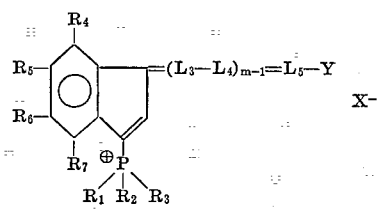

(IV)

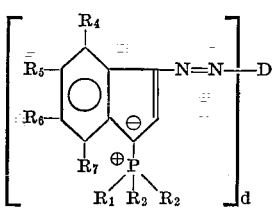

wherein $R_1$, $R_2$, $R_3$, $R_4$, $R_5$, $R_6$ and $R_7$ are as defined above in Formula I, $L_1$, $L_2$, $L_3$, $L_4$ and $L_5$ each represent a methine group, $m$ is a positive integer from 1 to 5, $R_8$ is an alkyl radical, Q represents the non-metallic atoms necessary to complete a heterocyclic nucleus, Y can be either an aryl radical or an indenyl radical, X represents an acid anion, $d$ is either 1 or 2, and D is aryl (when $d$ is 1), and arylene (when $d$ is 2). A wide variety of dyes having one of these formulae can be employed. $L_1$, $L_2$, $L_3$, $L_4$ and $L_5$ each represent a methine group such as $=CH-$, $=C(-CH_3)-$, $=C(-C_2H_5)-$,
$=C(-C_3H_7)-$, $=C(-CH_2C_6H_5)-$, $=C(-C_6H_5)-$,
$=C(-alkoxy)-$, $=C(-aryloxy)-$,
$=C(-S-alkyl)-$, $=C(-Se-alkyl)-$,
$=C(-O-acyl)-$, $=C(-amide)-$, etc.

Highly useful results are obtained when lower membered methine groups, e.g., $=CH-$, $=C(-CH_3)-$, and $=C(-C_2H_5)-$, are employed. $R_8$ can be an alkyl, including substituted alkyl, radical up to 10 carbon atoms or higher. The lower membered radicals, e.g., methyl, ethyl, propyl, isopropyl, or butyl, are preferred. Q can be any combination of non-metallic atoms sufficient to complete a substituted or unsubstituted heterocyclic ring. Typical heterocyclic nuclei which Q can represent contain from 5 to 6 atoms in the heterocyclic ring, such as quaternary salts formed from nuclei of the thiazole series (e.g., thiazole,
4-methylthiazole,
4-phenylthiazole,
5-methylthiazole,
5-phenylthiazole,
4,5-dimethylthiazole,
4,5-diphenylthiazole,
4-(2-thienyl)-thiazole,
benzothiazole,
4-chlorobenzothiazole,
5-chlorobenzothiazole,
6-chlorobenzothiazole,
7-chlorobenzothiazole,
4-methylbenzothiazole,
5-methylbenzothiazole,
6-methylbenzothiazole,
5-bromobenzothiazole,
6-bromobenzothiazole,
4-phenylbenzothiazole,
5-phenylbenzothiazole,
4-methoxybenzothiazole,
5-methoxybenzothiazole,
6-methoxybenzothiazole,
5-iodobenzothiazole,
6-iodobenzothiazole,
4-ethoxybenzothiazole,
5-ethoxybenzothiazole,
tetrahydrobenzothiazole,
5,6-dimethoxybenzothiazole,
5,6-dioxymethylenebenzothiazole,
5-hydroxybenzothiazole,
6-hydroxybenzothiazole,
naphtho[1,2]thiazole,
naphtho[2,1]thiazole,
5-methoxynaphtho[2,1]thiazole,
5-ethoxynaphtho[2,1]thiazole,
8-methoxynaphtho[1,2]thiazole,
7-methoxynaphtho[1,2]thiazole,
4'-methoxythianaptheno-7',6,4,5-thiazole, etc.), those of the oxazole series (e.g., 4-methyloxazole,
5-methyloxazole,
4-phenyloxazole,
4,5-diphenyloxazole,
4-ethyloxazole,
4,5-dimethyloxazole,
5-phenyloxazole,
benzoxazole,
5-chlorobenzoxazole,
5-methylbenzoxazole,
5-phenylbenzoxazole,
6-methylbenzoxazole,
5,6-dimethylbenzoxazole,
4,6-dimethylbenzoxazole,
5-methoxybenzoxazole,
5-ethoxybenzoxazole,
5-chlorobenzoxazole,
6-methoxybenzoxazole,
5-hydroxybenzoxazole,
6-hydroxybenzoxazole,
naphtho[1,2]oxazole,
naphtho[2,1]oxazole, etc.), those of the selenazole series (e.g., 4-methylselenazole,
4-phenylselenazole,
benzoselenazole,
5-chlorobenzoselenazole,
5-methoxybenzoselenazole,
5-hydroxybenzoselenazole,
tetrahydrobenzoselenazole, naphtho[1,2]selenazole,
naphtho[2,1]selenazole, etc.), those of the thiazoline series (e.g., thiazoline,
4-methylthiazoline, etc.), those of the quinoline series such as 2-quinoline (e.g., quinoline,
3-methylquinoline,
5-methylquinoline,
7-methylquinoline,
8-methylquinoline,
6-chloroquinoline,
8-chloroquinoline,
6-methoxyquinoline,
6-ethoxyquinoline,
6-hydroxyquinoline,
8-hydroxyquinoline, etc.), 4-quinoline (e.g., quinoline,
6-methoxyquinoline,
7-methylquinoline,
8-methylquinoline, etc.), 1-isoquinoline (e.g., isoquinoline,
3,4-dihydroisoquinoline, etc.), 3-isoquinoline (e.g., isoquinoline, etc.), those of the benzimidazole series (e.g., 1,3-diethylbenzimidazole,
1,3-diethyl-5-chlorobenzimidazole,
1,3-diethyl-5,6-dichlorobenzimidazole,
1-ethyl-3-phenylbenzimidazole, etc.).

Y can be an aryl radical such as phenyl, napthyl, dialkyl-aminoaryl such as dimethylaminophenyl, 4-dimethyl-aminonaphthyl, etc., or a 1-triarylphosphoranylidene-3-idenyl radical, such as 1-triphenylphosphoranylidene-3-indenyl, etc. The aryl and 1-triarylphosphoranylidene-3-idenyl radical which Y represents can be substituted, for example, with a halide, an alkyl group (such as methyl, ethyl, propyl, isopropyl, butyl, etc., especially a lower alkyl group), an aryl group (such as phenyl, tolyl, napthyl, chlorophenyl, methoxyphenyl, phenyloxyphenyl, etc., especially a lower aryl group), a hydroxy group, an alkoxy group (such as methoxy, ethoxy, propoxy, etc., especially, a lower alkoxy group), an aryloxy group (e.g., phenyl-oxy), a carboxy group, a cyano group, a nitro group, a substituted or unsubstituted amino group (such as dimethylamino, methylethylamino, diethylamino, etc.), a sulfo group, a sulfino group, etc. A highly useful embodiment of the present invention is obtained when Y represents an aryl radical which contains a dialkyl substituted amino group at its para position. A highly useful example of one such Y is p-dimethylaminophenyl. Also, when Y represents an unsubstituted or mono substituted 1-triarylphosphoranylidene-3-idenyl radical, highly useful results are produced. "X" can be freely chosen from numerous negatively charged acid anions, e.g., halide, sulfonate, perchlorate, p-toluenesulfonate, thiocyanate, benzenesulfonate, etc. D can be either a substituted or unsubstituted aryl radical, i.e., when $d$ is 1 (such as phenyl, tolyl, naphthyl, etc.) or a substituted or unsubstituted arylene radical, i.e., when $d$ is 2 (such as phenylene, biphenylene, naphthylene, etc.). Both the aryl and the arylene radical (which D represents) can be substituted, for example, with the same groups as described for $R_4$, $R_5$, $R_6$ and $R_7$ above (see Formula I). The aryl radical can be up to penta substituted, while any two of the substituents can be strongly electron withdrawing. Groups which are strongly electron withdrawing, i.e., those groups which exert a strong pulling force on their electrons, making them less available for sharing in the dye system, include nitro, cyano, sulfo, carboxy, formyl, fluoro, chloro and the like. Highly useful results are obtained when D represents a lower membered aryl group, such as a phenyl, a mono-, and a di-substituted phenyl group (e.g., p-methoxyphenyl, p-nitrophenyl, p-fluorophenyl, etc.). When $d$ equals 2, the compound is a diazo compound in which the two azo linkages are joined through an arylene radical, such as biphenylylene, phenylene, naphthylene or binaphthylene. When the arylene group is symmetrical the resultant disazo dye is symmetrical. However, symmetry is not essential, and does not appear to have any great effect on the disazo dyes' utility. Specific examples of the phosphocyanine dyes of the present invention include:

3-ethyl-2-[2-(1-triphenylphosphoranylidene-3-indenyl) vinyl]benzothiazolium iodide,
1-ethyl-2-[2-(1-triphenylphosphoranylidene-3-indenyl) vinyl]naphtho[1,2-d]thiazolium p-toluenesulfonate,
3-methyl-2-[1-triphenylphosphoranylidene-3-indenyl] benzothiazolium p-toluenesulfonate,
1,3,3-trimethyl-2-[2-(1-triphenylphosphoranylidene-3-indenyl)vinyl]indolinium iodide,
1-p-dimethylaminobenzylidene-3-indenyltriphenylphosphonium perchlorate,
[3-(1-indenylidenetriphenylphosphorane)]-[1-(3-indenyltriphenylphosphonium)]monomethinephosphocyanine perchlorate,
3-(3-cyano-2,5-dihydro-2-oxo-4-phenyl-5-furylidenemethyl)-1-indenylidenetriphenylphosphorane,
2-[2-(1-triphenylphosphoranylidene-3-indenyl)vinyl] benzoxazolium iodide,
2-[2-(1-triphenylphosphoranylidene-3-indenyl)vinyl] benzoselenazolium perchlorate,
2-[2-(1-triphenylphosphoranylidene-3-indenyl)vinyl] quinolinium iodide,
[3-(1-indenylidenetriphenylphosphorane)]-[1-(3-indenyltriphenylphosphonium)]trimethinephosphocyanine perchlorate, and
2-[2-(1-triphenylphosphoranylidene-3-indenyl)vinyl] benzimidazolium perchlorate.

Specific examples of the azo dyes of the present invention include:

3-phenylazo-1-indenylidenetriphenylphosphorane,
3-(p-methoxyphenylazo)-1-indenylidenetriphenylphosphorane,
3-(p-nitrophenylazo)-1-indenylidenetriphenylphosphorane,
3-(p-methylphenylazo)-1-indenylidenetriphenylphosphorane,
3-(p-dimethylaminophenylazo)-1-indenylidenetriphenylphosphorane,
3-(p-fluorophenylazo)-1-indenylidenetriphenylphosphorane,
3-(2,4,6-trimethylphenylazo)-1-indenylidenetriphenylphosphorane,
3-(5-chloro-2-hydroxy-4-methylphenylazo)-1-indenylidenetriphenylphosphorane,
3-(2,4-dinitrophenylazo)-1-indenylidenetriphenylphosphorane, and
3,3'-(3,3'-dimethoxy-4,4'-biphenylenebisazo)bis(1-indenylidenetriphenylphosphorane).

I have further found that photographic silver halide emulsions can be spectrally sensitized with various dyes of the present invention having one of the general structures as described in Formulae II and III above. These dyes are especially sensitive in varying degrees to light in the green and red regions of the spectrum. Since the natural sensitivity of a silver halide emulsion is restricted to light in the shorter wavelength regions of the visible spectrum, i.e., the violet and blue regions, the addition of a novel phosphocyanine dye of the present invention to a light sensitive silver halide emulsion can usefully and efficiently extend the sensitivity of the said emulsion to light in the longer wavelength regions of the visible spectrum, i.e., the green and red regions.

As mentioned above, many of the dyes of our invention are particularly useful in manufacturing photographic, silver halide emulsions, serving to alter the sensitivity thereof. Sensitization by means of our new dyes is, of course, directed primarily to the ordinarily employed, gelatino-silver-halide, developing-out emulsions. The dyes are advantageously incorporated in the washed, finished emulsion and should, of course, be uniformly distributed throughout the emulsion. In the preparation of the photographic emulsions containing our new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Pyridine has proven satisfactory as a solvent for the majority of our new dyes.

The concentration of our new dyes in the emulsion can vary widely, i.e., from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in pyridine or other suitable solvent and a volume of this solution (which may be diluted with methanol) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromoiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions, such as those listed above, containing the sensitizing dyes of our invention can also contain such addenda as chemical sensitizers, e.g., sulfur sensitizers, (e.g., allyl thiocarbamide, thiourea, allylisothiocyanate, cystine, etc.), various gold compounds (e.g., potassium chloroaurate, auric trichloride, etc.) (see U.S. Pats. 2,540,085; 2,597,856 and 2,597,915), various palladium compounds such as palladium chloride (U.S. 2,540,086), potassium chloropalladate (U.S. 2,598,079), etc., or mixtures of such sensitizers; antifoggants, such as ammonium chloroplatinate (U.S. 2,566,245), ammonium chloroplatinate (U.S. 2,566,263), benzothiazole, nitrobenzimidazole, 5-nitroindazole, benzidine, mercaptans, etc. (see Mees—"The Theory of the Photographic Process," MacMillan Pub., 1942, page 460), or mixtures thereof; hardeners, such as formaldehyde (U.S. 1,763,533), chrome alum (U.S. 1,763,533), glyoxal (U.S. 1,870,354), dibromacrolein (British 406,750), etc., color couplers, such as those described in U.S. Pat. 2,423,730, Spence and Carroll (U.S. Pat. 2,640,776), etc.; or mixtures of such addenda. Dispersing agents for color couplers, such as those set forth in U.S. Pats. 2,322,027, and 2,304,940, can also be employed in the above-described emulsions.

The following specific examples will serve to more fully explain the practice of my invention. However, it will be understood that these are only examples and in no way limiting of this invention. In these examples, all temperatures are in degrees centigrade.

EXAMPLE 1

This example demonstrates the preparation of 1-indenylidenetriphenylphosphorane.

A solution of 0.9 mole of 1-bromoindene, 0.7 mole of triphenylphosphine, and 1 liter of acetonitrile is stirred overnight at reflux, cooled in an ice bath, and treated dropwise with 0.7 mole of aqueous 28 percent ammonia. After completion of the addition the mixture is stirred one-half hour. The red-brown solid is filtered, washed with acetonitrile, and dried to give crude product. Recrystallization from chloroform gives 15–20 percent of pale yellow crystalline product, M.P. 205–207° (dec.), containing one molecule of chloroform of crystallization.

Other 1-indenylidenetriarylphosphoranes can be prepared in a similar way by substituting the desired triarylphosphine for the triphenylphosphine of the present reaction.

EXAMPLE 2

This example shows a useful print out system which employs 1-indenylidenetriphenylphosphorane as prepared in Example 1 above.

A 3–5 percent solution of 1-indenylidenetriphenylphosphorane in chloroform or 1,2-dichloroethane is coated on baryta paper using a 0.01 inch knife. Exposure for 5–15 seconds through a negative to a sun lamp gives a violet image on a pale yellow background. The background is still light sensitive. The image is fixed by bathing in 2 N hydrochloric acid to give a violet image on a white background.

It must be noted that the presence of one mole of chloroform per mole of 1-indenylidenetriphenylphosphorane, i.e., the resultant product when 1-indenylidenetriphenylphosphorane is recrystallized from chloroform, is necessary for image formation. When either the 1-indenylidenetriphenylphosphoranechloroform complex or a coating of it is dried at 80–90° under vacuum, the resulting coating will not give an image. If a little chloroform is added to a solution of the dried complex in 1,2-dichloroethane, a support coated with this solution would give an image under the previously described conditions. Other 1-indenylidenetriarylphosphoranes of Formula I can be substituted for the 1-indenylidenetriphenylphosphorane of this example with equivalent results.

Examples 3–10 show the preparation of various of the phosphocyanine dyes described by Formulae II and III above. Other dyes having one of the general Formulae II and III can be prepared in similar ways by substituting for a reaction component in any of the examples the related reactant necessary to yield the desired dye.

EXAMPLE 3

3-ethyl-2-[2-(1-triphenylphosphoranylidene-3-indenyl) vinyl]-benzothiazolium iodide A mixture of .0500 mole of 1-indenylidenetriphenylphosphorane chloroform complex, .0549 mole of 2-β-acetanilidovinyl-3-ethylbenzothiazolium iodide and 150 ml. of pyridine is stirred at reflux for one-half hour, cooled in an ice bath, and diluted with 150 ml. of water. The mixture is stirred at room temperature for three hours and then cooled overnight in the refrigerator. The solid is filtered, washed with water, and dried to give greenish-gold crystals, M.P. 239–241°. Recrystallization with filtration from 750 ml. of acetonitrile gives 82.6 percent of crystalline product, M.P. 239–240°. $\lambda_{max}$ (CHCl$_3$)=548 m$\mu$ (log $\epsilon$=5.08).

EXAMPLE 4

1,3,3-trimethyl-2-[2(1-triphenylphosphoranylidene-3-indenyl)vinyl]indolium iodide A mixture of 2-β-acetanilidovinyl-1,3,3-trimethylisoindolium iodide (0.005 mole), 0.05 mole of 1-indenylidenetriphenylphosphorane, and 150 ml. of pyridine is stirred at reflux for 30 min. The mixture is cooled in ice bath and diluted with 2 l. of water. The water is decanted from the residue. Another 1 l. of water is added and the slurry is repeated. The residue is boiled in 150 ml. of 3A alc. and cooled overnight yielding a green crystalline product. Recrystallization with filtration from 500 ml. of 3A alcohol gave 66% of green crystalline product (M.P. 168–170). $\lambda_{max}$ (CHCl$_3$)=540 m$\mu$ (log $\epsilon$=4.97).

EXAMPLE 5

1-p-dimethylaminobenzylidene-3-indenyl-triphenylphosphonium perchlorate

A mixture of 0.025 mole of the 1-indenylidenetriphenylphosphorane, 0.025 mole of sodium perchlorate, 0.025 mole of p-dimethylaminobenzaldehyde, 100 ml. of pyridine, and 1 ml. of glacial acetic acid is heated to boiling with stirring, allowed to cool to room temperature, and diluted with 1 liter of water. The liquid phase is poured off and the residue boiled in 250 ml. of ethanol and then cooled to room temperature. The solid is filtered, sucked dry, and recrystallized from chlorobenzene to give 26 percent dark red crystals, M.P. 124°, resolidifying gradually and decomposing at 244°. The dye retained one molecule of chlorobenzene of crystallization. $\lambda_{max}$ (CHCl$_3$)=535 m$\mu$ (log $\epsilon$=4.74).

EXAMPLE 6

[3 - (1 - indenylidenetriphenylphosphorane)] - [1-(3-indenyltriphenylphosphonium)] trimethinephosphocyanine perchlorate A mixture of 0.05 mole of the 1-indenylidenetriphenylphosphorane-chloroform complex, 0.025 mole of 1,3,3-trimethoxypropene, 0.05 mole of sodium perchlorate, 2 ml. of glacial acetic acid, and 150 ml. of pyridine is refluxed with stirring for one-half hour, cooled to room temperature, diluted with 1 liter of water, and allowed to stand with occasional stirring for four hours. The solid is filtered and dried, (M.P. 175–185°). Recrystallization from 300 ml. of 1:1 2-butanone-tetrahydrofuran gives 41 percent green crystals, M.P. 207–213°, (dec. at 240°), $\lambda_{max}$ (CHCl$_3$)=662 m$\mu$ (log $\epsilon$=5.16).

EXAMPLE 7

[3 - (1 - indenylidenetriphenylphosphorane)] - [1 - (3-indenyltriphenylphosphonium)]monomethinephosphocyanine perchlorate A mixture of 0.050 mole of 1-indenylidenetriphenylphosphorane chloroform complex, 0.025 mole of triethyl orthoformate, 0.050 mole of anhydrous sodium perchlorate, 2 ml. of glacial acetic acid, and 200 ml. of pyridine is heated to boiling with mechanical stirring. The mixture is cooled in ice and diluted slowly with stirring with 400 ml. of water. The solid is filtered, washed with water, and dried to give gray crystals, M.P. 120–140°. Two recrystallizations from chlorobenzene gives dark red crystals. Upon slow heating in a capillary the dye is liquefied at 130° and gradually resolidified to a green glass which melts with decomposition at 250°. $\lambda_{max}$ (CHCl$_3$) (log $\epsilon$); 557 m$\mu$ (4.85); 585 m$\mu$ (4.82).

EXAMPLE 8

2-(3-cyano-2,5-dihydro-2-oxo-4-phenyl-5-furylidenemethyl)-1-indenylidenetriphenylphosphorane A mixture of 0.04 mole of 1-indenylidenetriphenylphosphorane, 0.04 mole of 3-cyano-5-dimethylaminomethylene-4-phenyl-2(5H)-furanone, 150 ml. of pyridine and 1 ml. of glacial acetic acid is refluxed with stirring for 3 hours. The mixture is cooled to room temperature, diluted with 150 ml. of water, and allowed to stand for 24 hours with occasional stirring. The solid is filtered and dried to give dark red product, M.P. 137–142°. Recrystallization from 1:1 pyridine-ethanol gives 74.2 percent brown crystals. M.P. 265–266° (dec.). $\lambda_{max}$ (tetrahydrofuran)=589 m$\mu$ (log $\epsilon$=5.06).

EXAMPLE 9

1-ethyl-2-[2-(1-triphenylphosphoranylidene-3-indenyl) vinyl]naphtho[1,2-d]thiazolium p-toluenesulfonate A mixture of 0.02 mole of 2-anilinovinyl-1-ethylnaphtho[1,2-d]thiazolium p-toluenesulfonate, 0.02 mole of the 1-indenylidenetriphenylphosphorane chloroform complex, 0.02 mole of triethylamine, 0.02 mole of acetic anhydride, and 100 ml. of 3A alcohol is refluxed with stirring for one-half hour, cooled to room temperature, and poured slowly with stirring into 1 liter of water. The liquid is decanted and the residual gum boiled with 200 ml. of 2-butanone and allowed to stand overnight. The solid is filtered and recrystallized by extraction with 300 ml. of 2-butanone from a thimble in a Soxhlet apparatus to give 38 percent dark red crystals, M.P. 239–241°. $\lambda_{max}$ (CHCl$_3$)=568 m$\mu$ (log $\epsilon$=5.06).

EXAMPLE 10

3-methyl-2-[1-triphenylphosphoranylidene-3-indenyl]benzothiazolium p-toluenesulfonate A mixture of 0.10 mole of 3-methyl-2-(methylthio)benzothiazolium p-toluenesulfonate, 0.10 mole of the 1-indenylidenetriphenylphosphorane chloroform complex, 250 ml. of pyridine and 1 ml. of glacial acetic acid is stirred and heated to boiling and then concentrated at the water pump. Recrystallization of the residue from 300 ml. of ethanol gives 84.0 percent pale yellow crystals, M.P. 255–258° with softening at 236°; $\lambda_{max}$ (CHCl$_3$) =4.36 m$\mu$ (log $\epsilon$=4.81).

EXAMPLE 11

This example relates to the preparation of one of the azo dyes of the present invention described by Formula IV above. The dye compound, 3-phenylazo-1-indenylidenetriphenylphosphorane is prepared in the following manner.

To a mixture of 0.05 mole of 1-indenylidenetriphenylphosphorane chloroform complex as prepared in Example 1, 250 ml. of dichloroethane and 0.30 mole of aqueous 28 percent ammonia at 0–5° is added dropwise with mechanical stirring a solution of benzenediazonium chloride derived from 0.05 mole of aniline, 12.5 ml. (0.150 eq.) of concentrated hydrochloric acid, 20 g. of ice, 0.05 mole of sodium nitrite, and 10 ml. of water. The mixture is stirred overnight after completion of the addition. The organic layer is separated, washed with 200 ml. of water, dried with anhydrous sodium sulfate, and concentrated at the water pump. The residue is boiled in 300 ml. of ethanol. Filtration of the cooled mixture gives orange-brown powder. $\lambda_{max}$ (CHCl$_3$)=466 m$\mu$ (log $\epsilon$=4.05).

Other phenylazo dyes as described by Formula IV can be prepared in a similar way by substituting the desired phenyldiazonium salt for the benzenediazonium chloride.

EXAMPLE 12

This example relates to the preparation of one of the disazo dyes of the present invention described by Formula IV above. The dye compound 3,3'-(dimethoxy-4,4'-biphenylylenebisazo)bis - (1 - indenylidenetriphenylphosphorane) is prepared in the following manner.

To a suspension of 0.05 mole of 3,3'-dianisidine in 80 ml. of 6 N hydrochloric acid at 0° C. is added dropwise a solution of 0.10 mole of sodium nitrite in 15 ml. of water. The resulting red-brown solution is filtered and the filtrate added with stirring at 0 to 10° C. to a mixture of 0.10 mole of 1-indenylidenetriphenylphosphorane chloroform complex, 800 ml. of 1,2-dichloroethane, 300 ml. of water and 100 ml. of aqueous (28 percent) ammonia. The resulting mixture is stirred over a two day period. About 500 ml. of saturated sodium chloride solution is stirred into the mixture. After allowing to settle, the bottom layer is separated, washed with 500 ml. of water, dried over anhydrous sodium sulfate, concentrated to about 300 ml., diluted with 300 ml. of ethyl alcohol and cooled overnight in a refrigerator. The solid is removed by filtration and air dried to yield crude product. After recrystallization from pyridine the product has a melting point of 268–271° C.

EXAMPLE 13

A dye as described in Formulae II and III above is added to gelatino silver bromoiodide emulsion (containing 10% iodide) in amount sufficient to give a concentration of 0.165 gram of the dye per mole of silver. The resulting emulsion is then coated onto a cellulose acetate film support at a coverage of 432 mg. of silver and 1220 mg. of gelatin per square foot of support.

A sample of the coated support is then exposed on an Eastman 1b sensitometer using a tungsten light source with a Wratten 16 filter (which only passes through light with wavelengths longer than 500 m$\mu$) and processed for 3 minutes at 68° F. in Kodak D-19 developer which has the following composition:

|   | G. |
|---|---|
| N-methyl-p-aminophenol sulfate | 2.0 |
| Sodium sulfite (anhydrous) | 90.0 |
| Hydroquinone | 8.0 |
| Sodium carbonate (monohydrate) | 52.5 |
| Potassium bromide | 5.0 |
| Water to make 1.0 liter. | | then fixed, washed and dried. The results for various dyes of the present invention are listed below.

TABLE 1

| Example: | Concentration, g./mole Ag | Sensitivity range, m$\mu$ | Sensitivity maximum, m$\mu$ | Minus blue relative speed |
|---|---|---|---|---|
| 3 | 0.165 | 500–640 | 580 | 1,590 |
| 4 | 0.165 | 500–610 | 570 | 631 |
| 5 | 0.165 | 500–630 | 570 | 126 |
| 6 | 0.165 | 560–730 | 690 | 100 |
| 7 | 0.165 | 500–630 | 610 | 32 |

Referring to Table 1, it will be seen that while both the symmetrical and unsymmetrical phosphocyanine dyes are useful spectral sensitizers, the unsymmetrical ones are more active. This is clearly illustrated by a comparison of their minus blue relative speeds. Since the minus blue relative speed is a measure of the sensitivity of a given dye to the non-blue region of the visible spectrum, the more active dyes will have higher minus blue relative speeds. The unsymmetric dyes, such as Examples 3–4, having a positively charged heterocyclic ring as their second nucleus, yield the best results. This would indicate that phosphocyanine dyes of the present invention which have a nitrogen containing heterocyclic ring as its second nucleus are especially well suited to function as efficient spectral sensitizers. However, even the symmetric dyes do possess distinct spectral sensitizing properties. Referring to Table 1, it will be seen that the dye with the greatest range sensitivity and also the greatest sensitivity maximum is symmetrical. This dye, Example 6, is extremely useful since both its range and area of maximum sensitivity are in the red (600–700 m$\mu$ region of the visible spectrum. Example 6 contains a 1-propen-1-yl-3-ylidene methine linkage joined to two 1-indenylidenetriphenylphosphorane groups. The great increase in maximum sensitivity of this dye is especially striking when compared to the comparable minus blue relative speed of the other symmetric dye. Only Example 6 with its 1-propen-1-yl-3-ylide linkage has a minus blue relative speed comparable to the least active of the unsymmetric dyes. The increase in spectral activity of this symmetric dye can be attributed to its propyl-like methine linkage, which distinguishes it from the other symmetrical dyes, which have only a monomethine-type linkage. This would seem to indicate the improved spectral sensitivity of Example 6 is caused by the increased length of the compound's resonance system. This result indicates that a symmetric dye with a polymethine linkage is especially well suited to function in the longer wavelength regions of the visible spectrum.

EXAMPLE 14

The procedure as described in Example 13 is repeated comparing two of the phosphocyanine dyes of the present invention with the analogous cyclopentadienylidenetriphenylphosphorane dye. The results for these dyes are listed below.

TABLE 2

[Comparison of dyes from 3-cyclopentadienylidenetriphenylphosphorane (A) to those from 1-indenylidenetriphenylphosphorane]

| Compound | Concentration, g./m. in BrI | Sensitivity range, m$\mu$ | Sensitivity maximum, m$\mu$ | Minus blue relative speed |
|---|---|---|---|---|
| (A) cyclopentadienylidene–CH=CH–CH=cyclopentadienyl-$\oplus$P(C$_6$H$_5$)$_3$, $\oplus$P(C$_6$H$_5$)$_3$, ClO$_4^-$ | 0.08 | 570–650 | 630 | 12 |
| Example 6 | 0.165 | 560–730 | 690 | 100 |
| indenyl–CH=CH–benzothiazole(Et), $\oplus$P(C$_6$H$_5$)$_3$, ClO$_4^-$ | 0.165 | 590 | 555 | 251 |
| Example 3 | 0.165 | 640 | 580 | 1,590 |

Referring to Table 2, it will be seen that while both types of dyes act as spectral sensitizers, the 1-indenylidenetriphenylphosphorane dyes are clearly more active. Both the indenylidene dyes, i.e., Examples 6 and 1, are sensitive to light in the visible spectrum which is 50 m$\mu$ to 80 m$\mu$ longer than the furthermost light which the analogous cyclopentadienylidene dye is sensitive to. Also the maximum sensitivity of the indenylidene dyes is some 25 m$\mu$ to 60 m$\mu$ further into the non-blue region of the spectrum than its cyclopentadienylidene counterpart. Thus, not only are the indenylidene dyes of the present invention sensitive in more non-blue regions of the spectrum than the corresponding cyclopentadienylidene dyes, but also the former are most sensitive, i.e., area of maximum sensitivity, in regions of the spectrum where the sensitivity of the later dyes is waning or even nonexistent. This marked superiority of the indenylidene dyes is most dramatically illustrated by a comparison of the dyes respective minus blue relative speed. Referring again to Table 2, the indenylidene dyes are more spectrally sensitive in non-blue regions of the visible spectrum by a factor of approximately 8 to 1 over the corresponding cyclopentadienyl dyes. These results indicate that the indenylidene dyes function as a more efficient and active class of phosphocyanine spectral sensitizers than those of the prior art.

EXAMPLE 15

The following example illustrates one way in which the dyes, as described in Formula IV above, can be used to dye acrylonitrile polymer textile material. An amount of 0.1 gram of dye is dissolved by warming in 5 cc. of methyl Cellosolve. A 2% aqueous solution of a nonionic surfactant, such as Igepal CA (a polymerized ethylene oxide alkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made from an acrylic fiber is entered and, in the case of Orlon 42, the dyeing is carried out at the boil for one hour. In the case of materials made of Verel acrylic fiber the dyebath temperature should not exceed 90° C. in order to avoid damage to the fiber. The dyed material is then washed well with water and dried.

The results of the coloring effect of various dyes on two sample acrylonitrile polymer textile materials are given below.

TABLE 3

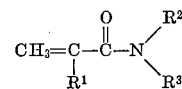

| | Color of dyed fabric | |
|---|---|---|
| R | Orlon | Verel |
| H— | Orange | Orange. |
| p-CH$_3$O— | Orange-red | Orange-red. |
| pNO$_2$ | Yellow | Yellow-brown. |
| p-CH$_3$— | Orange | Orange. |
| p-(CH$_3$)$_2$N— | Olive-green | Blue-violet. |
| p-F— | Orange | Orange. |

Textile materials dyed by the dyes of the invention are characterized by containing at least about 35% combined acrylonitrile units and up to about 95% acrylonitrile units, and modified, for example, by 85-5% of vinyl pyridine units as described in U.S. Pats. 2,990,393 (Re. 25,533) and 3,014,008 (Re. 25,539) or modified by 65-5% of vinylpyrrolidone units, for example, as described by U.S. Pat. 2,970,783 or modified with 65-5% acrylic ester or acrylamide units as described in U.S. Pats. 2,879,253; 2,879,254 and 2,838,470. Similar amounts of the other polymeric modifiers mentioned above are also useful. A preferred group of the copolymers readily dyeable with the dyes of the invention are the modacrylic polymers such as described in U.S. Pat. 2,831,826 composed of a mixture of (a) 70-95% by weight of a copolymer of from 30 to 65% by weight of vinylidene chloride or vinyl chloride and 70-35% by weight of acrylonitrile, and (b) 30-5% by weight of a second polymer from the group consisting of (1) homopolymers of acrylamidic monomers of the formula $$CH_3=C-\overset{O}{\overset{\|}{C}}-N\diagdown_{R^3}^{R^2}$$
$$\underset{R^1}{|}$$

wherein $R^1$ is selected from the group consisting of hydrogen and methyl, and $R^2$ and $R^3$ are selected from the group consisting of hydrogen and alkyl groups of 1-6 carbon atoms, (2) copolymers consisting of at least two of said acrylamidic monomers, and (3) copolymers consisting of at least 50% by weight of at least one of said acrylamidic monomers and not more than 50% by weight of polymerizable monovinyl pyridine monomer.

A particularly efficacious group of modacrylic polymers is an acetone soluble mixture of (a) 70-95% by weight of a copolymer of 30-65% by weight of vinylidene chloride and 70-35% by weight of acrylonitrile and (b) 30-5% by weight of an acrylamide homopolymer having the above formula wherein $R^1$, $R^2$ and $R^3$ are as described above. Specific polymers of that group contain 70-95% by weight of (a) a copolymer of from 30-65% by weight of vinylidene chloride and 70-35% by weight of acrylonitrile and (b) 30-5% by weight of a lower N-alkylacrylamide polymer such as poly-N-methacrylamide, poly-N-isopropylacrylamide and poly-N-tertiarybutylacrylamide.

Referring to Table 3, it will be seen that the azo dyes as described in Formula IV above are capable of dyeing a wide variety of fabrics to a wide range of colors in the visible spectrum. These results indicate that the azo dyes of the present invention are especially well suited to the textile art.

In addition, the disazo dyes as described by Formula IV above when $d$ is 2, have unexpected properties when compared to the monoazo dyes, especially when they are used for dyeing acrylic textiles, including improved affinity and improved brightness and fastness to light. Thus, the disazo dyes of the present invention can be expected to be superior to similar but distinct dyes when tested by methods such as described in the A.A.T.C.C. Technical Manual, 1964 edition, depending in part upon the particular dye used and the fiber being dyed.

Although the invention has been described in considerable detail with particular reference to preferred embodiments thereof, variations and modifications can be effected within the spirit and scope of the invention as described hereinbefore and as defined in the appended claims.

I claim:

1. A photographic silver halide emulsion spectrally sensitized with a phosphocyanine dye of one of the following general formulae:

(I)

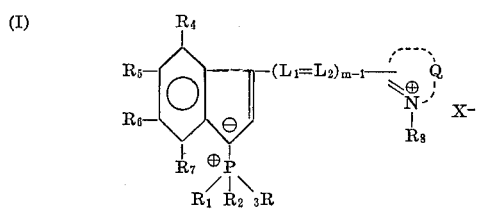

and

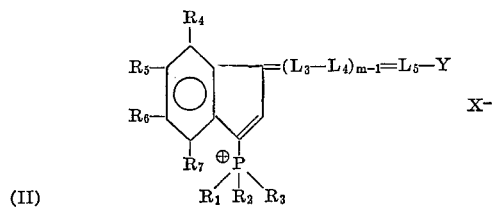

(II)

wherein $R_1$, $R_2$ and $R_3$ are aryl, $R_4$, $R_5$, $R_6$ and $R_7$ each are selected from the group consisting of an H, alkyl, aryl, halogen, hydroxy, alkoxy, aryloxy, carboxy, cyano, nitro, amino, sulfo and sulfino group, $L_1$, $L_2$, $L_3$, $L_4$ and $L_5$ each represents a methine group, $m$ is a positive integer from 1 to 5, $R_8$ is an alkyl radical, Q represents the non-metallic atoms necessary to complete a heterocyclic nucleus containing 5 to 6 atoms in the heterocyclic ring, Y is selected from the group consisting of an aryl radical and a 1-triarylphosphoranylidene-3-indenyl radical, and X is an anion.

2. A photographic silver halide emulsion as described in claim 1 wherein Q represents the non-metallic atoms necessary to complete a nucleus selected from the group consisting of a thiazolium nucleus, an indolinium nucleus, an oxazolium nucleus, a selenazolium nucleus, a thiazolinium nucleus, a quinolinium nucleus, and a benzimidazolium nucleus.

3. A photographic sliver halide emulsion as described in claim 1 wherein $R_1$, $R_2$ and $R_3$ are phenyl, $R_4$, $R_5$, $R_6$ and $R_7$ are hydrogen, and $L_1$, $L_2$, $L_3$, $L_4$ and $L_5$ are each —CH=.

4. A photographic silver halide emulsion as described in claim 1 wherein said emulsion is spectrally sensitized with 3 - ethyl - 2[2 - (1 - triphenylphosphoranylidene-3-indenyl)vinyl]benzothiazolium iodide.

5. A photographic silver halide emulsion as described in claim 1 wherein said emulsion is spectrally sensitized with 1,3,3-trimethyl-2[2-(1 - triphenylphosphoranylidene-3-indenyl)vinyl]indolinium iodide.

6. A photographic silver halide emulsion as described in claim 1 wherein Y is selected from the group consisting of phenyl, naphthyl, p-alkylaminophenyl, p-dialkylaminophenyl and 4-dialkylaminonaphthyl.

7. A photographic silver halide emulsion as described in claim 1 wherein said emulsion is spectrally sensitized with 1-p-dimethylaminobenzylidene - 3 - indenyltriphenylphosphonium perchlorate.

8. A photographic silver halide emulsion as described in claim 1 wherein Y is a 1-triarylphosphoramylidene-3-indenyl radical.

9. A photographic silver halide emulsion described in claim 1 wherein said emulsion is spectrally sensitized with [3-(1-indenylidenetriphenylphosphorane)]-[1-(3-indenyltriphenylphosphonium)]trimethinephosphocyanine perchlorate.

10. A photographic element comprising a support having coated thereon a photographic silver halide emulsion as described in claim 1

References Cited

UNITED STATES PATENTS

| | | | |
|---|---|---|---|
| 3,140,283 | 7/1964 | Depoorter et al. | 96—102 |
| 3,143,544 | 8/1964 | Dormael | 96—102 |

J. TRAVIS BROWN, Primary Examiner

U.S. Cl. X.R.

260—144, 240, 606.5